US010718736B2

(12) United States Patent
Jungo

(10) Patent No.: US 10,718,736 B2
(45) Date of Patent: Jul. 21, 2020

(54) METHOD AND DEVICE FOR MONITORING AND/OR DETERMINING THE CONDITION OF A MEASURING PROBE

(71) Applicant: Mettler-Toledo GmbH, Greifensee (CH)

(72) Inventor: Daniel Jungo, Geroldswil (CH)

(73) Assignee: Mettler-Toledo GmbH, Greifensee (CH)

( * ) Notice: Subject to any disclaimer, the term of this patent is extended or adjusted under 35 U.S.C. 154(b) by 123 days.

(21) Appl. No.: 16/036,387

(22) Filed: Jul. 16, 2018

(65) Prior Publication Data

US 2019/0017961 A1 Jan. 17, 2019

(30) Foreign Application Priority Data

Jul. 17, 2017 (EP) .................................. 17181636

(51) Int. Cl.
*G01N 27/416* (2006.01)
*G01N 27/30* (2006.01)
(Continued)

(52) U.S. Cl.
CPC ....... *G01N 27/4165* (2013.01); *G01N 27/302* (2013.01); *G01N 27/4035* (2013.01); *G01N 27/4163* (2013.01); *G01N 27/333* (2013.01)

(58) Field of Classification Search
CPC ............. G01N 27/302; G01N 27/4163; G01N 27/4165; G01N 27/3273; G01N 27/333; G01N 27/4065
See application file for complete search history.

(56) References Cited

U.S. PATENT DOCUMENTS 3,661,748 A * 5/1972 Blackmer ............ G01N 27/404
 204/401
6,392,416 B1 5/2002 Keech
(Continued)

FOREIGN PATENT DOCUMENTS

AU 88688/82 A 3/1984

OTHER PUBLICATIONS

Cusidó, J. et al., Signal Injection as a Fault Detection Technique, Sensors, 11, pp. 3356-3380, Mar. 21, 2011.
(Continued)

*Primary Examiner* — Alexander S Noguerola
(74) *Attorney, Agent, or Firm* — Standley Law Group LLP; Jeffrey S. Standley; Stephen L. Grant

(57) ABSTRACT

The operation of a measuring probe used for measuring at least one property of a process material is monitored or determined while the measuring probe is in use. The measured property can be a pH measurement, or a $CO_2$ or oxygen concentration of the process material. The measuring probe has an electrode with a sensing element. When the sensing element is in contact with the process material, the electrode delivers a measurement signal to the measurement signal circuit, where the electrode voltage is related to the measured property. The signal-processing unit determines a measurement quantity of the measured property using the measurement signal. When a test signal is delivered by the signal source to the test signal circuit during a verification phase, a coupling element ensures galvanic isolation between the measurement signal circuit and the test signal circuit.

10 Claims, 3 Drawing Sheets

(51) Int. Cl.
*G01N 27/403* (2006.01)
*G01N 27/333* (2006.01)

(56) References Cited

U.S. PATENT DOCUMENTS

| | | | |
|---|---|---|---|
| 7,950,264 B2 | 5/2011 | Klees et al. | |
| 8,197,651 B2* | 6/2012 | Nishio | C03C 3/111 |
| | | | 204/420 |
| 2002/0102884 A1* | 8/2002 | Pechstein | G01N 27/286 |
| | | | 439/660 |
| 2009/0251152 A1 | 10/2009 | Ammann | |
| 2013/0241530 A1* | 9/2013 | Wernet | G01D 3/08 |
| | | | 324/76.11 |

OTHER PUBLICATIONS

Endress + Hauser, Technical Information Memosens, New technology for contactless, inductive, digital transmission of pH signals, Endress + Hauser GmbH + Co. KG Instruments International, pp. 1-12, TI376C/07/en/03.04.
Mettler-Toledo Ingold, Introduction, Selecting a Measurement System, Process Measurement Solutions Catalog Jun. 2005, Mettler-Toledo GmbH, pp. 8-9, Jun. 2005.
Moore Industries, Signal Isolators, Converters and Interfaces: The "Ins" and "Outs", Moore Industries, pp. 1-12, Nov. 2008.

\* cited by examiner

METHOD AND DEVICE FOR MONITORING AND/OR DETERMINING THE CONDITION OF A MEASURING PROBE

CROSS-REFERENCE TO RELATED APPLICATIONS

This application claims priority to European patent application 17181636.6, filed on 17 Jul. 2017, which is incorporated by reference as if fully recited herein.

TECHNICAL FIELD

The invention relates to relates to a method and device for monitoring and/or determining the condition of a measuring probe adapted to measure at least one property of a process material, such as for example an ion-sensitive measuring probe, in particular a pH-measuring probe, an oxygen-measuring probe, or a $CO_2$-measuring probe. More particularly, the present disclosure relates to stimulation means, used notably for measuring resistance of a measuring circuit of the measuring probe.

BACKGROUND

The monitoring and control of industrial processes, for example in the chemical and pharmaceutical industries, in the textile industry, in the food and beverage industries, in the processing of paper and cellulose, or in the fields of water processing and waste water treatment, is based on the measurement of process variables that are determined by means of suitable measuring probes.

According to "Process Measurement Solutions Catalog 2005/June", Mettler-Toledo GmbH, CH-8902 Urdorf, Switzerland, pages 8 and 9, a complete measuring system consists of a housing, a measuring probe, a cable and a measurement converter (also called a transmitter). By means of the housing, the measuring probe is brought into contact with the process that is to be measured or monitored, for example by immersing the probe in the process material and holding it there. The measuring probe serves to measure specific properties of the process. Measurement signals are sent through the cable to the transmitter, which communicates with a process control system and converts the measuring signals into readable data. The measuring probes are selected depending on the process material properties that are to be measured.

Typically, an electrochemical measuring probe such as for example a pH-measuring probe or an oxygen-measuring probe is subject to a load-dependent wear process which is inherent in the functional principle of the probe and which normally leads to a continuous change of the measurement characteristics of the measuring probe.

In order to take into consideration the impact of such changes into the accuracy of measurements, it is known from the state if the art to monitor essentials electrical characteristics of the signal measuring circuit of a probe, such as the resistivity. In particular, it is known to feed the signal measuring circuit of a probe with a test signal generated by a stimulation circuit, as disclosed for example in patent document US 2009/0251152 A1. For example, for determining the resistance of the signal measuring circuit connected to the pH glass of an electrode, a rectangular impulse signal is switched onto the measuring signal, the resulting combined signal being then passed through electronic filters and like correctors to determine said glass resistance. Condensers, operated in parallel to the measuring signal, come generally in between the stimulation circuit and the signal measuring circuit, to dynamically shape the test signal.

However, in this configuration, leakage currents between the signal measuring circuit and the electrically connected stimulation circuit, cannot be avoided, and may affect accuracy of measurements adversely. This issue is even more relevant for measuring probe delivering weak measuring signal, for example pH measuring probe provided with an electrode with a high pH-glass resistance, typically greater than 1 Gohm.

To mitigate these problems, patent document GB 2 333 161 A discloses for example means for limiting leakage currents from the signal measuring circuit to the stimulation circuit. However the measuring signal is still influenced by the stimulation circuit, since the signal measuring circuit is coupled and influenced by the glass resistance circuit used for testing/diagnostic reasons. Moreover, the described solution does not allow the direct determination of the impedance of the glass electrode on its own, but instead of the circuit formed by the glass electrode immersed in the process material.

That's why there is still a need for improved means for determining, during a verification phase, in a measuring system comprising a measuring probe for use in contact with a process material, at least one electrical characteristic of a sensing element of an electrode included in the measuring probe, adapted to be used with measuring probes delivering weak measurement signal, connected to the measuring signal circuit.

SUMMARY

To that end, according to a first aspect, the present invention concerns a measuring system comprising a measuring probe for use in contact with a process material. The measuring probe may be selected from the group consisting of: a pH-measuring probe, an oxygen-measuring probe and a $CO_2$-measuring probe.

The measuring system comprises an electrode provided with a sensing element arranged so as to deliver a measurement signal into a measurement signal circuit, the electrode voltage being related to at least one property of the process material when the electrode is in contact with the process material.

The sensing element of the electrode may comprise an active layer behaving as a voltage source, the electrode voltage being not null when the electrode is not in contact with the process material.

For example, the electrode may comprise a solid-state pH sensor comprising an active layer behaving as a voltage source. The electrode may comprise an ion pH sensitive glass substrate and several layers on top of said ion pH sensitive glass substrate. The layers may comprise an elementar/lithium layer, a Lithium Phosphorus Oxynitride— generally designed by the acronym LiPON-layer, and a protective layer adapted to limit degradations of the lithium layer as well as to provide a packaging structure for stabilizing the whole glass electrode against environmental influences. The electrical potential of the glass electrode of the measuring probe 1 is not null, even when the glass electrode is not in contact with the process material 6.

The measuring system comprises a signal-processing unit adapted to determine a measurement quantity related to the at least one property of the process material during operation of the measuring probe according to the measurement signal.

The measuring system comprises a signal source configured to deliver, during a verification phase, a test signal into a test signal circuit.

The test signal can be one signal or a combination of signals from the following non-exhaustive list: pulses, bipolar pulses, rectangular, triangular, sinusoidal, sawtooth.

The measuring system comprises a coupling element arranged to ensure galvanic isolation between the measurement signal circuit and the test signal circuit.

Advantageously, the signal-processing unit is configured, during the verification phase, to determine at least one electrical characteristic of the sensing element of the electrode by observing the measurement signal altered by the test signal. The at least one electrical characteristic of the sensing element may be the resistance of the sensing element.

According to the invention, the test signal circuit and the measurement signal circuit are now galvanically separated circuits. Consequently, it is now possible to provide the measurement quantity related to the at least one property of the process material—for example a pH value—with improved accuracy compared to prior known solutions, since the measuring signal circuit is not affected anymore by leakage currents from the test signal circuit. Also, as electrical separation between the test signal circuit and the measurement signal circuit is achieved, the test signal circuit cannot be influenced anymore by the electrical characteristics of the sensing element of the electrode.

Moreover, according to the invention, the measuring signal, coming for example from the glass electrode (in the case of a solid-state pH sensor, a voltage typically varying around 3V) is directly altered by the test signal. Therefore, the invention allows determining directly at least one electrical characteristic of the glass electrode—i.e. impedance of the glass electrode on its own, instead of measuring characteristics of the glass electrode and the process material as previously known—i.e. impedance measured between a glass electrode and a reference electrode.

The disturbance, caused by the test signal circuit into the measuring signal circuit through the coupling element, used for example, to determine the resistance of the glass electrode, no longer influences measurement quantity. It also provides the additional benefit that the electrical characteristic of the sensing element can be determined more quickly.

In an embodiment, the coupling element is arranged so as that the test signal is fed into an inductive element generating accordingly an electromagnetic field altering the measurement signal in the measurement signal circuit. More particularly, the coupling element may comprise a transformer provided with a primary winding connected between the test signal circuit and a second ground connection, and a secondary winding connected between the measurement signal circuit and the signal-processing unit. The primary winding and the secondary winding being electrically isolated. The effective galvanic isolation ensured by the use of the inductive element is particularly advantageous, since leakage currents are completely removed. The elimination of leakage currents from the test signal circuit affecting the measurement signal circuit is particularly advantageous, since a high level of accuracy in measurements of the at least one electrical characteristic can be achieved, even with measuring systems comprising an electrode provided with a solid-state pH sensor with an active layer behaving as a voltage source. This solution consequently allows obtaining a measuring system, insensitive to the disturbances of the leakage currents from the test signal circuit, and are considerably more efficient compared to known solution using a capacitive element as coupling element between the test signal circuit and the measurement signal circuit which cannot completely prevent leakage currents and consequently cannot ensure an effective galvanic isolation between the test signal circuit and the measurement signal circuit. Using a transformer as a coupling element is also a reliable and cost-effective solution.

The coupling element may comprise mechanical, optical and/or electrical means for ensuring the galvanic isolation between the measurement signal circuit and the test signal circuit.

According to a second aspect, the present invention also concerns a method for determining, during a verification phase, in a measuring system comprising a measuring probe for use in contact with a process material, at least one electrical characteristic of a sensing element of an electrode included in the measuring probe. The method is notably adapted to be implemented in the measuring system according to the first aspect. The method comprises the following steps:

Transmitting into a signal circuit, a measurement signal delivered by the sensing element, the measurement signal being related to at least one property of the process material when the electrode is in contact with the process material;

Transmitting, during a verification phase, into a test circuit, a test signal;

Altering the measurement signal with the test signal by ensuring galvanic isolation between the measurement signal circuit and the test signal circuit;

Determining the at least one electrical characteristic of the sensing element of the electrode, by observing the measurement signal altered by the test signal

BRIEF DESCRIPTION OF THE DRAWINGS

Details of the disclosed method and device will become apparent from the description of the embodiments which are shown in schematic and simplified representation in the drawings, wherein.

DETAILED DESCRIPTION OF THE EMBODIMENTS

Figure 1:
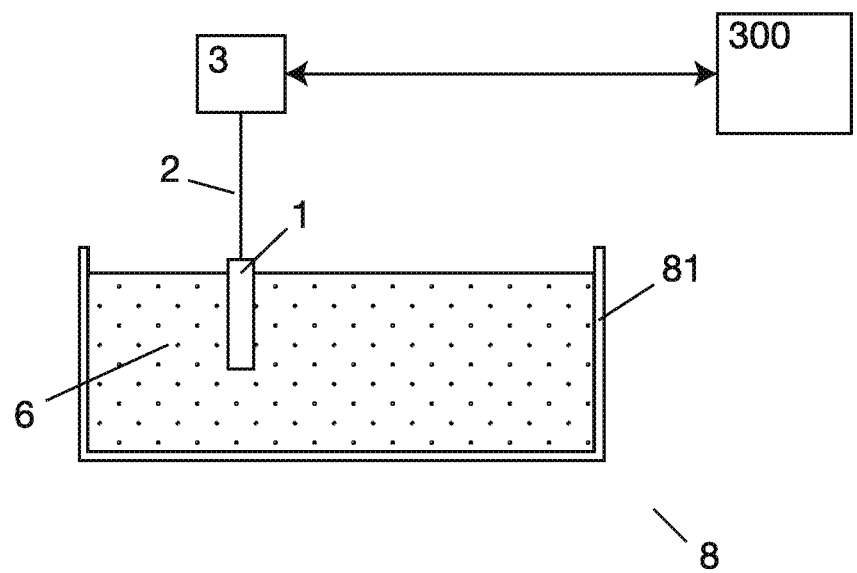
FIG. 1 illustrates the principal structure of a system for measuring at least one property of a process material 6 by means of a measuring probe 1.

FIG. 1 illustrates a measuring system with a container 8 comprising a holding vessel 81 filled with a process material 6. The properties of the process material 6 are measured by means of at least one measuring probe 1 which is connected through signal-transmitting device 2 to an evaluating device 3. The evaluating devices 3, which, among other functions, serve as measurement converters, are coupled to a processing device 300, for example a computer.

Figure 2:
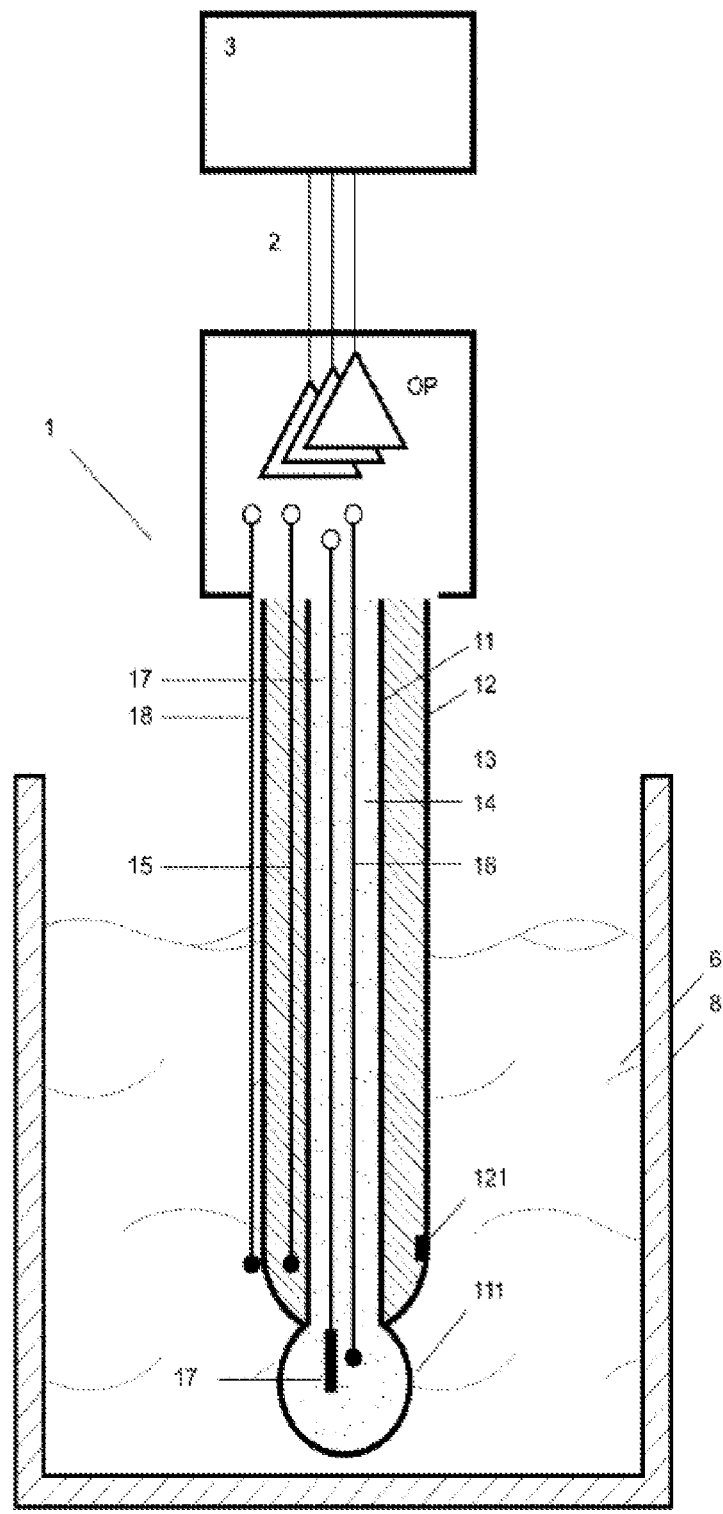
FIG. 2 schematically illustrates an electrochemical measuring probe 1 which is immersed in a process material 6 and coupled to an evaluating device 3.

The principal design structure of an electrochemical measuring probe such as for example a pH-measuring probe, which in the configuration of a single rod measuring chain includes a glass electrode 16, a reference electrode 15, and an auxiliary electrode 18, is represented schematically in FIG. 2. In the measuring probe 1, the glass electrode with a conductor lead element 16 and the reference electrode with a reference lead element 15 are constructively combined in one unit. Inside a first chamber within an inner tube 11 and a thin-walled glass hemisphere or glass membrane 111 adjoining the tube, the conductor lead element 16 is immersed in a solution with a defined pH value, specifically an inner buffer 14, which establishes the electrically conductive connection between the inside of the glass membrane 111 and the conductor lead element 16. Inside an outer tube 12, the reference lead element 15 is immersed in an electrolyte, specifically an outer buffer 13 which, by way of a porous separating wall or diaphragm 121, allows an exchange of electrical charges to take place with the measurement material 6.

The electrical potentials of the signal source (seen as signal source SQ1 in FIG. 3) which during the measurement set themselves up at the conductor lead element 16, at the reference lead element 15, and/or at the auxiliary electrode 18 are measured and then further processed with the signal-processing unit OP, preferably an operational amplifier. In the inner buffer space, a temperature-measuring sensor 17 is arranged, which provides the possibility to automatically compensate for temperature effects and to register temperature cycles. The signal-processing unit OP, which will be described in more detail below, is incorporated in the head of the measuring probe 1 and connected by way of signal lead 2 to the evaluating device 3.

In an embodiment, the measuring probe 1 is a solid-state pH sensor comprising an active layer behaving as a voltage source. The glass electrode 16 of the measuring probe 1 comprises typically an ion pH sensitive glass substrate and several layers on top of said ion pH sensitive glass substrate. The layers may comprise an elementar/lithium layer, a Lithium Phosphorus Oxynitride—generally designed by the acronym LiPON-layer, and a protective layer adapted to limit degradations of the lithium layer as well as to provide a packaging structure for stabilizing the whole glass electrode against environmental influences. In this embodiment, the electrical potential of the glass electrode 16 of the measuring probe 1 is not null, even when the conductor lead element 16 is not immersed in the holding vessel 81 filled with the process material 6. This behaviour is notably due to the electrical characteristics of the elementar/lithium layer and the Lithium Phosphorus Oxynitride layer. As a consequence, the electrical potentials of the signal source (seen as signal source SQ1 in FIG. 3) are not null, even when the conductor lead element 16 is not immersed in the holding vessel 81—for example, the potential observed at the glass electrode 16 is sensibly around −3V when the glass electrode is not in contact with the process material 6.

Figure 3:
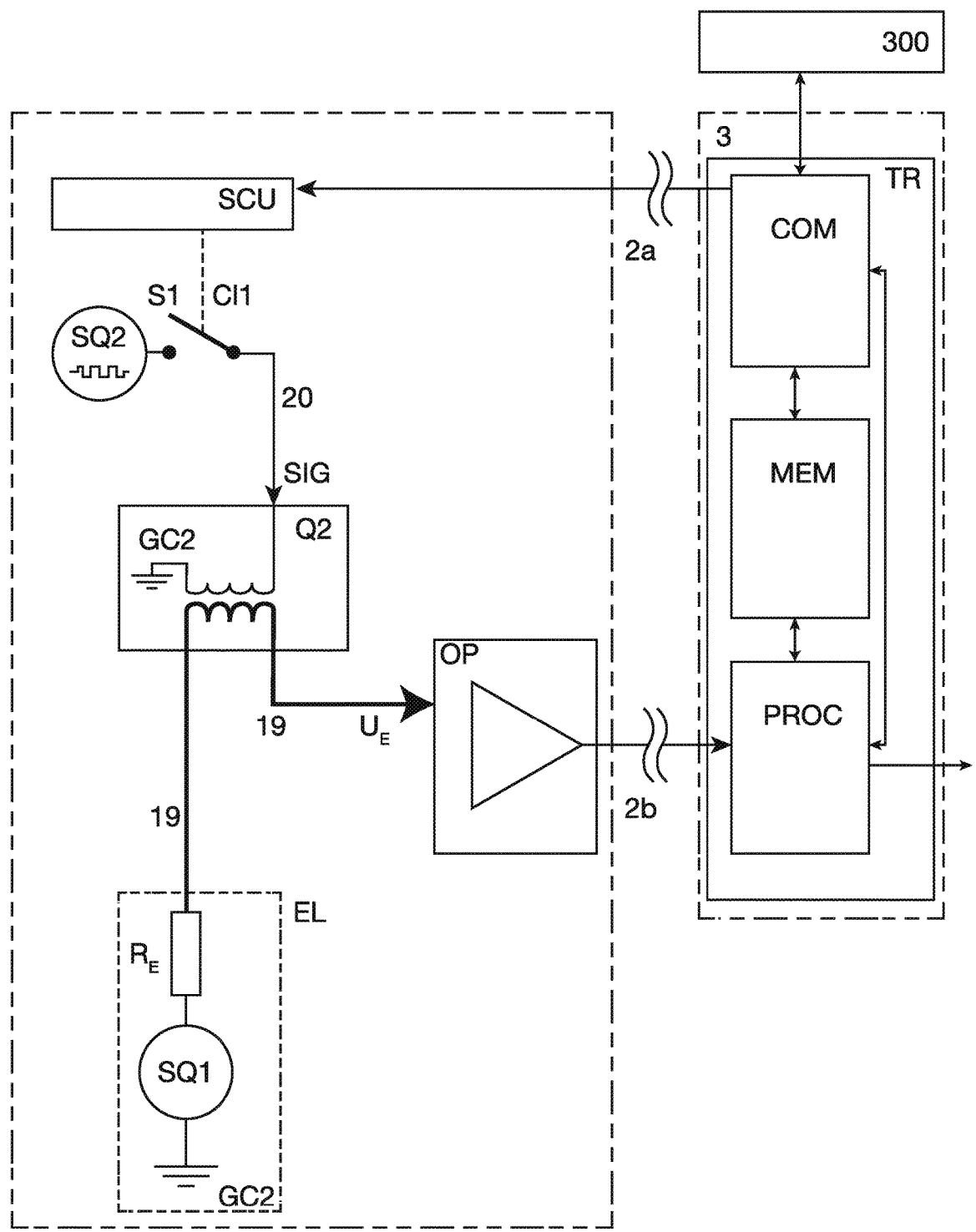
FIG. 3 represents a block diagram of a measuring system comprising a measuring probe 1 with electrode EL, a measuring signal circuit 19, a test signal circuit 20, and a coupling element Q2.

FIG. 3 shows the measuring device of FIG. 2 in an advantageous embodiment with a measuring probe 1 which includes at least one electrode EL, for example a glass electrode and a reference electrode, delivering a measuring signal. Depending on the measuring probe 1 used, at the electrode EL, an electrode voltage UE may be observed either only when the measuring probe 1 is immersed in the process material 6 or constantly—in the case of use of a solid-state pH sensor, for example. The electrode EL itself forms a voltage source SQ1 whose internal resistance is represented in the drawing as the electrode resistance RE.

The voltage source SQ1 is coupled to a first ground connection GC1. For example, the glass membrane of a glass electrode represents a very high resistance, while the transition resistance of the reference electrode results in a relatively low resistance value. However, the electrode resistance RE is dependent on the temperature observed at the measuring probe 1, and becomes very small above 100 degrees Celsius.

The measuring signal, more particularly the electrode voltage UE, is sent for processing to a signal processing unit OP by way of a measuring signal circuit 19. Next, the not yet processed, partially processed or fully processed signals are transmitted through a connecting lead 2b to a signal evaluating unit PROC. The signal-evaluating unit PROC is incorporated in an evaluating device 3 or a transmitter 3 and can communicate through internal connections with a memory unit MEM and a communication unit COM. The processed and/or evaluated measurements can subsequently be passed on to be used for example for the control and monitoring of the process system.

The evaluating unit 3 or the transmitter TR includes a variety of components such as a communication unit COM, a signal-evaluating unit PROC, and/or a memory unit MEM, which are connected bi-directionally among each other and thus are able to exchange data, instruction or programs.

The communication unit COM coordinates all activities of the measuring probe 1 and of the evaluating device 3 and establishes the communication to the master computer 300. Through the connection 2a, instructions are transmitted from the communication unit COM to a stimulation controller unit SCU in the measuring probe 1. The communication unit COM can also issue instructions to the signal-evaluating unit PROC, receive data from the signal-evaluating unit PROC, or also store data and programs in the memory unit MEM.

The stimulation controller unit SCU, which can also be incorporated in the signal-processing unit OP, functions as a controller element for the switching element S1 by sending control signals through the control output terminals CL1, thereby triggering responses in the switching element S1. The switching elements can be configured as mechanical or electronic elements or as semiconductor elements such as transistors. However, the switching operations can also be performed directly with the controller unit CU.

By means of the switching element S1, a test signal SIG, such as bipolar pulses, can be delivered, by way of a test signal circuit 20, during a verification phase to a coupling element Q2. The test signal SIG can be generated by way of a signal source SQ2. The test signal SIG is used for example to determine the resistance of the glass electrode 16, as described for example in patent document US 2009/0251152 A1.

The coupling element Q2 ensures galvanic isolation between the measuring signal circuit 19 carrying the electrode voltage UE and the test signal circuit 20 carrying the test signal SIG. Consequently, the coupling element Q2 also allows modulating the electrode voltage UE with the test signal SIG. The coupling element Q2 is arranged to prevent leakage of current from the test signal circuit 20 to the measurement signal circuit 19.

In an embodiment, the coupling element Q2 is arranged so as that the test signal SIG is fed into an inductive element generating accordingly an electromagnetic field altering the electrode voltage UE. For example, as illustrated on FIG. 3, the coupling element Q2 may comprise a transformer provided with a primary winding connected between the test signal circuit 20 and a second ground connection GC2 and a secondary winding connected between the measurement signal circuit 19 and the signal-processing unit OP. The primary winding and the secondary winding are not electrically connected, but inductively coupled.

Alternatively, the coupling element Q2 may comprise mechanical, optical and/or electrical means for ensuring the galvanic isolation between the measurement signal circuit 19 carrying the electrode voltage UE and the test signal circuit 20 carrying the measurement signal SIG.

Figure 4:
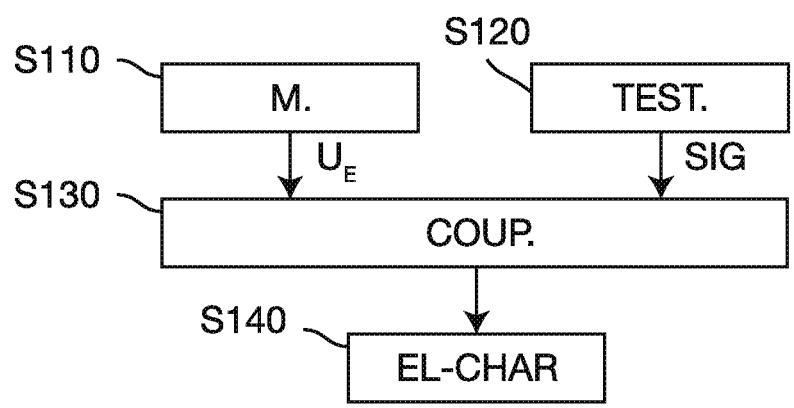
FIG. 4 represents a diagram of steps of a method for determining, during a verification phase, at least one electrical characteristic of a sensing element of an electrode of a measuring probe.

FIG. 4 schematically represents a method for determining, during a verification phase, at least one electrical characteristic—for example its resistance—of the sensing element of an electrode. The method comprises the following steps:

During a step S110, transmitting, into the signal circuit, a measurement signal delivered by the sensing element, the measurement signal being related to at least one property of the process material when the electrode is in contact with the process material;

During a step S120, transmitting, during a verification phase, into a test circuit, a test signal;

During a step S130, altering the measurement signal with the test signal by ensuring galvanic isolation between the measurement signal circuit and the test signal circuit;

During a step S140, determining the at least one electrical characteristic of the sensing element of the electrode, by observing the measurement signal altered by the test signal.

The invention claimed is:

1. A system for measuring at least one property of a process material, comprising:
    a measuring probe that is in contact with the process material;
    a measurement signal circuit;
    a test signal circuit;
    an electrode of the measuring probe, comprising a sensing element that comprises an active layer of lithium phosphorus oxynitride that operates as a voltage source, providing a "not null" electrode voltage when the electrode is not in contact with the process material, the electrode arranged to deliver a measurement signal into the measurement signal circuit, the electrode having a voltage that is related to the at least one property of the process material when the electrode is in contact therewith;
    a signal-processing unit for determining a measurement quantity related to the at least one property of the process material during operation of the measuring probe according to the measurement signal;
    a signal source, configured to deliver, during a verification phase, a test signal into the test signal circuit; and
    a coupling element, arranged to modulate the electrode voltage with the test signal and to ensure that the measurement signal circuit and the test signal circuit are galvanically isolated from each other.

2. The system of claim 1, wherein the coupling element is arranged so that the test signal from the signal source is fed into an inductive element that generates an electromagnetic field that alters the measurement signal in the measurement signal circuit.

3. The system of claim 2, wherein the coupling element comprises a transformer with primary and secondary windings that are electrically isolated from each other, the primary winding connected between the test signal circuit and a second ground connection, and the secondary winding connected between the measurement signal circuit and the signal-processing unit.

4. The system of claim 3, wherein, during the verification phase, the signal-processing unit observes the measurement signal altered by the test signal, thereby determining at least one electrical characteristic of the sensing element of the electrode.

5. The system of claim 4, wherein the measuring probe is selected from the group consisting of: a pH-measuring probe, an oxygen-measuring probe and a $CO_2$-measuring probe.

6. The system of claim 3, wherein the measuring probe is selected from the group consisting of: a pH-measuring probe, an oxygen-measuring probe and a $CO_2$-measuring probe.

7. The system of claim 1, wherein, during the verification phase, the signal-processing unit observes the measurement signal altered by the test signal, thereby determining at least one electrical characteristic of the sensing element of the electrode.

8. The system of claim 1, wherein the sensing element of the electrode comprises an active layer that operates as a voltage source, providing a "not null" electrode voltage when the electrode is not in contact with the process material.

9. The system of claim 1, wherein the measuring probe is selected from the group consisting of: a pH-measuring probe, an oxygen-measuring probe and a $CO_2$-measuring probe.

10. A method for determining at least one electrical characteristic of a sensing element of an electrode of a measuring probe that is used by contacting the sensing element with a process material, the method comprising the steps of:
    transmitting a voltage measurement signal from the sensing element, which comprises an active layer of lithium phosphorus oxynitride that operates as a voltage source and provides a "not null" electrode voltage when the electrode is not in contact with the process material, into a measurement signal circuit, the voltage measurement signal being related to at least one property of the process material when the electrode is in contact with the process material;
    transmitting, during a verification phase, a test signal from a voltage signal source into a test signal circuit;
    using the test signal to alter the voltage measurement signal, ensuring galvanic isolation of the measurement signal circuit and the test signal circuit from each other; and
    determining the at least one electrical characteristic of the sensing element of the electrode, by observing the alteration of the voltage measurement signal by the test signal.

* * * * *